US008843450B1

(12) United States Patent
Shioyama et al.

(10) Patent No.: US 8,843,450 B1
(45) Date of Patent: Sep. 23, 2014

(54) WRITE CAPABLE EXCHANGE GRANULAR LEVEL RECOVERIES

(75) Inventors: George Shioyama, Renton, WA (US); Matthew Buchman, Seattle, WA (US); Patrick Simonich, Renton, WA (US); Michael Jones, Lake Stevens, WA (US)

(73) Assignee: EMC Corporation, Hopkinton, MA (US)

( * ) Notice: Subject to any disclaimer, the term of this patent is extended or adjusted under 35 U.S.C. 154(b) by 46 days.

(21) Appl. No.: 13/173,553

(22) Filed: Jun. 30, 2011

(51) Int. Cl.
*G06F 17/30* (2006.01)

(52) U.S. Cl.
USPC .......................................... 707/650; 707/654

(58) Field of Classification Search
CPC ............ G06F 11/1469; G06F 11/1402; G06F 11/1458
USPC .................................................. 707/654, 650
See application file for complete search history.

(56) References Cited

U.S. PATENT DOCUMENTS

| 2009/0307449 A1* | 12/2009 | Prahlad et al. ................. 711/162 |
| 2010/0280996 A1* | 11/2010 | Gross et al. ................... 707/649 |
| 2011/0087874 A1* | 4/2011 | Timashev et al. ............. 713/100 |

OTHER PUBLICATIONS

VMware, VMware Data Recovery 1.0 Evaluators Guide, 2009, VMware Inc., Revision: 20090730, pp. 1-24.*

\* cited by examiner

*Primary Examiner* — Rehana Perveen
*Assistant Examiner* — Alexander Khong
(74) *Attorney, Agent, or Firm* — Van Pelt, Yi & James LLP

(57) ABSTRACT

A method for restoring associated with a collaborative software application is disclosed. A virtual file system exposing backup data of a collaborative software application stored in a backup data storage is created. A selection of a portion of the backup data to be restored to the collaborative software application is received via an interface associated with the virtual file system. The selected portion of the backup data is caused to be granularly restored to the collaborative management system without restoring one or more unselected portions of the backup data. A write capability of the virtual file system is used to modify a portion of the restored data in response to a write operation by the collaborative software application.

27 Claims, 6 Drawing Sheets

WRITE CAPABLE EXCHANGE GRANULAR LEVEL RECOVERIES

BACKGROUND OF THE INVENTION

Collaborative software applications provide various features, such as electronic mail, calendars, contacts, and tasks. Collaborative software applications also provide support for data storage and for mobile and web-based access to information. One example of collaborative software applications is Microsoft Exchange Server.

The contents and data of a collaborative software application can be lost after a data loss event. Restoring lost data of the collaborative software application can be performed in a number of ways. One approach is to perform an image-based full restore. In an image-based full-restore, one or more databases are restored at once. However, during the full-restore, the availability of the collaborative software application to the users of the application will be compromised. Since doing a full-restore is time-consuming, the collaborative software application can potentially be down for a long time.

BRIEF DESCRIPTION OF THE DRAWINGS

Various embodiments of the invention are disclosed in the following detailed description and the accompanying drawings.

DETAILED DESCRIPTION

Figure 1:
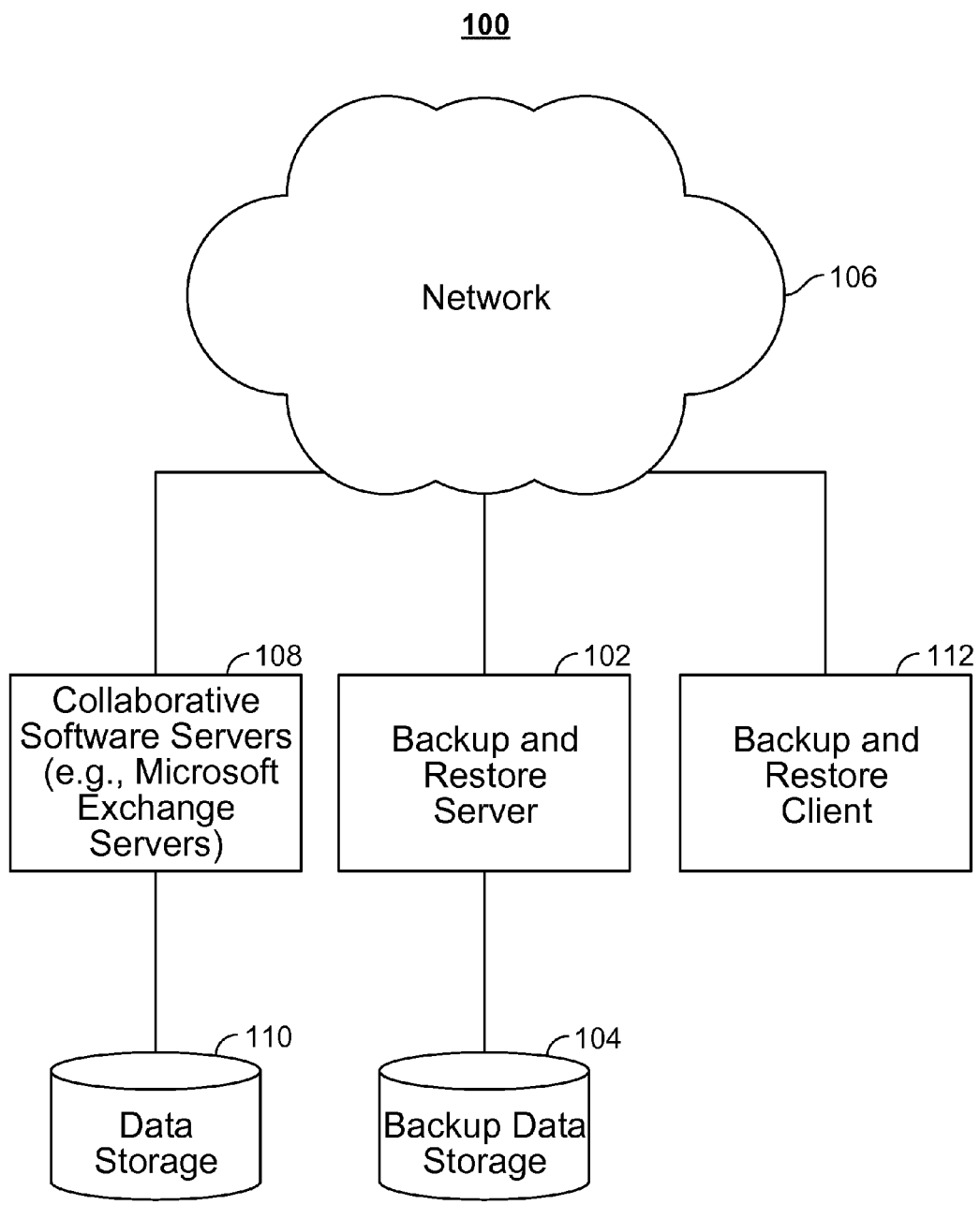
FIG. 1 is a block diagram illustrating an embodiment of a collaborative software application connected with a backup and restore system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Collaborative software applications provide various features, such as electronic mail, calendars, contacts, and tasks. Collaborative software applications also provide support for data storage and for mobile and web-based access to information. One example of collaborative software applications is Microsoft Exchange Server.

Microsoft Exchange Server is used hereinafter as an example for the collaborative software applications described above. Microsoft Exchange Server is selected for illustration purposes only; accordingly, the present application is not limited to this specific example only.

The contents and data of a collaborative software application can be lost after a data loss event. For example, the contents and data of Microsoft Exchange Server may be accidently deleted by end-users, intentionally corrupted by malicious efforts of outsiders, or destroyed by a disaster, such as a fire or earthquake. Therefore, the contents and data of the collaborative software application should be backed up periodically, such that they may be restored after a data loss event.

FIG. 1 is a block diagram illustrating an embodiment of a collaborative software application connected with a backup and restore system. The collaborative software application may include one or more collaborative software servers 108 (e.g., one or more Microsoft Exchange Servers 108). In some embodiments, the contents and data of the collaborative software application are stored in a data storage 110, wherein the contents and data may be organized in a plurality of databases. In some embodiments, the databases located in data storage 110 are structured query language (SQL) databases. In some embodiments, the contents and data of the collaborative software application may include e-mail messages, fax messages, contact lists, tasks, calendar entries, and the like.

One example of the backup and restore system is EMC Corporation's Avamar backup and restore system. As shown in FIG. 1, a backup and restore server 102 (e.g., an Avamar backup and restore server) is connected to collaborative software servers 108 (e.g., one or more Microsoft Exchange Servers 108) via network 106. In some embodiments, backup and restore server 102 may be in communication with collaborative software servers 108 using a dedicated communication link, one or more networks, a local area network, a wide area network, a storage area network, the Internet, a wired network, a wireless network, and the like. A system administrator of the collaborative software application (e.g., a Microsoft Exchange Server administrator) may use a backup and restore client 112 (e.g., an Avamar client) to configure backup and restore server 102 to periodically backup the contents and data of the collaborative software application into a backup data storage 104. For example, backup data storage 104 may include hard disks, solid state storages, virtual tape libraries (VTL), magnetic tapes, and the like.

Restoring lost data of the collaborative software application in FIG. 1 can be performed in a number of ways. One approach is to perform an image-based full restore. In an image-based full-restore, one or more databases in data storage 110 are restored at once. For example, the entire backup of the various databases may be restored directly to collaborative software servers 108 and data storage 110. However, during the full-restore, the availability of the collaborative software application to the users of the application will be compromised. Since doing a full-restore is time-consuming, the collaborative software application can potentially be down for a long time.

Another way to restore lost data of the collaborative software application is a granular-level restore approach. In a granular-level restore, as will be described in greater detail below, only the lost data items are located and restored back to collaborative software servers 108 and data storage 110. For example, in the Microsoft Exchange Server illustrative example, Microsoft Exchange Server contents and data including e-mail messages, mailboxes, fax messages, contact lists, tasks, and calendar entries can be individually restored.

In some embodiments, a backup process includes multiple passes. Such a backup process is referred to as a multi-pass backup process. In the first pass of the multi-pass backup process, an image-based backup is obtained and stored in backup data storage 104. This image-based backup can be used subsequently for restoring all the databases in data storage 110 in an image-based full-restore. For example, an image-based full-restore can be used to recover from a disk crash or other disasters.

In the second pass of the multi-pass backup process, a granular-level backup is obtained and stored in backup data storage 104. This granular-level backup can be used subsequently for a granular-level restore. For example, a granular-level restore can be used to recover a few lost data items that were accidentally deleted by an end-user. In this case, the end-user will request the system administrator to restore a few lost data items, and the system administrator may choose to do a granular-level restore instead of an image-based full-restore, which requires more time and resources.

In some embodiments, a single-pass backup process may be used. In a single-pass backup process, only one single backup is obtained and stored in backup data storage 104. This single backup can be used subsequently for either an image-based full restore or a granular-level restore.

Both the multi-pass backup process and the single-pass backup process described above may include data deduplication features. During backup, data deduplication divides files or streams of data (e.g., files that are backed up) into chunks of data. Each chunk of data is assigned an identification, which may be calculated using cryptographic hash functions. The identification is known as a signature, or fingerprint, for the chunk of data. If the signature of the current chunk of data is identical to the signature corresponding to another chunk of data previously stored in a data storage (the latter implemented, for example, as a storage disk), then a duplicate is detected. Accordingly, the duplicated chunk of data is not stored again in the data storage; instead, the duplicated chunk of data is replaced by a reference or a link to the chunk of data previously stored in the data storage. Conversely, if the signature of the current chunk of data is different from all the signatures corresponding to chunks of data that have been previously stored in the data storage, then the current chunk of data is a unique new chunk of data and is stored in the data storage. The signature of the current chunk of data is also stored in an index. During restore, data deduplication reconstructs files that have been backed up by reading chunks of data stored in the data storage and concatenating them together. Whenever a link or a reference is found, the link or reference is replaced with the referenced data chunk.

Figure 2:
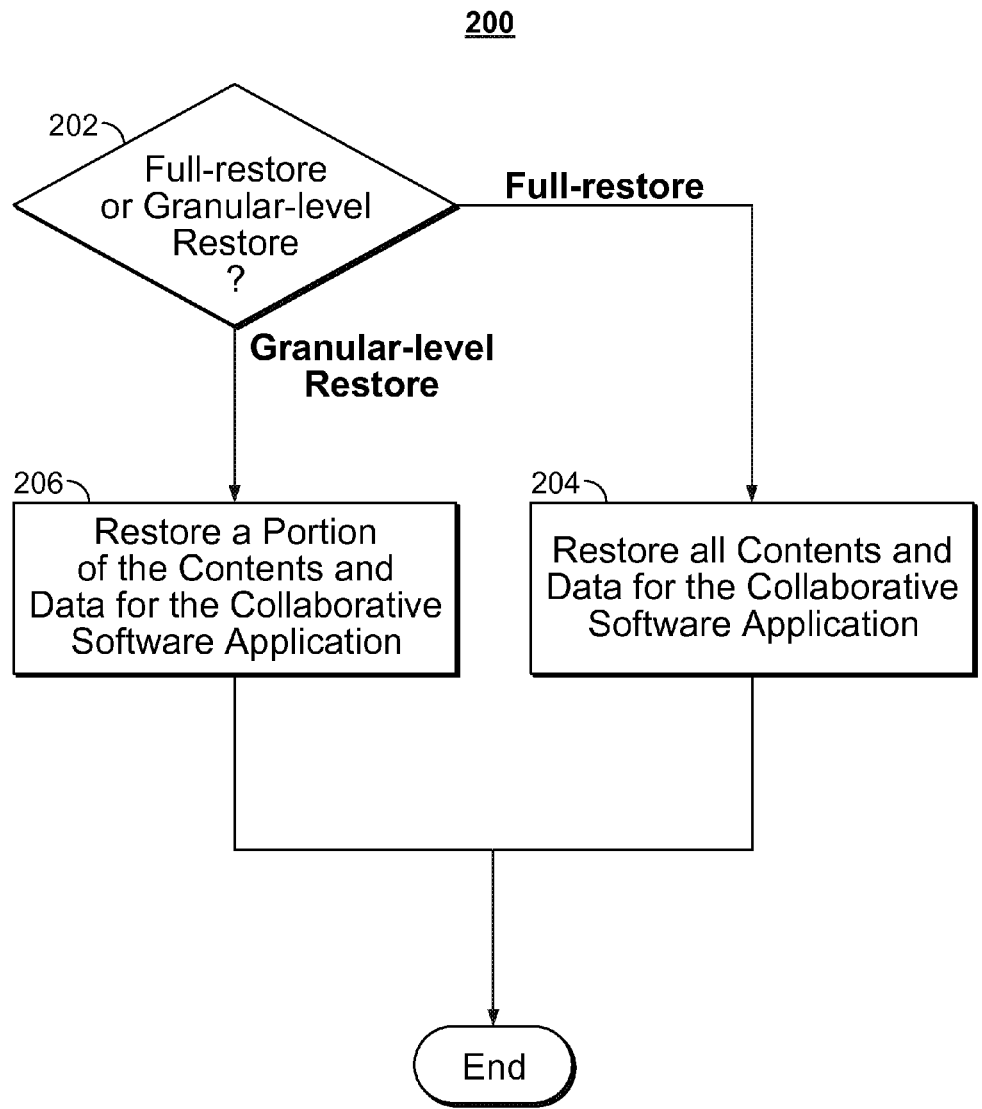
FIG. 2 is a flow chart illustrating an embodiment of a restore process 200.

FIG. 2 is a flow chart illustrating an embodiment of a restore process 200. At 202, either an image-based full-restore or a granular-level restore may be selected. For example, a Microsoft Exchange Server administrator may elect to do an image-based full-restore after a disk crash or disaster. At 204, an image-based full-restore is performed, and all the contents and data of the collaborative software application are restored. If the collaborative software application administrator elects to do a granular-level restore at 202, then only a portion of the contents and data of the collaborative software application is restored at 206.

Figure 3:
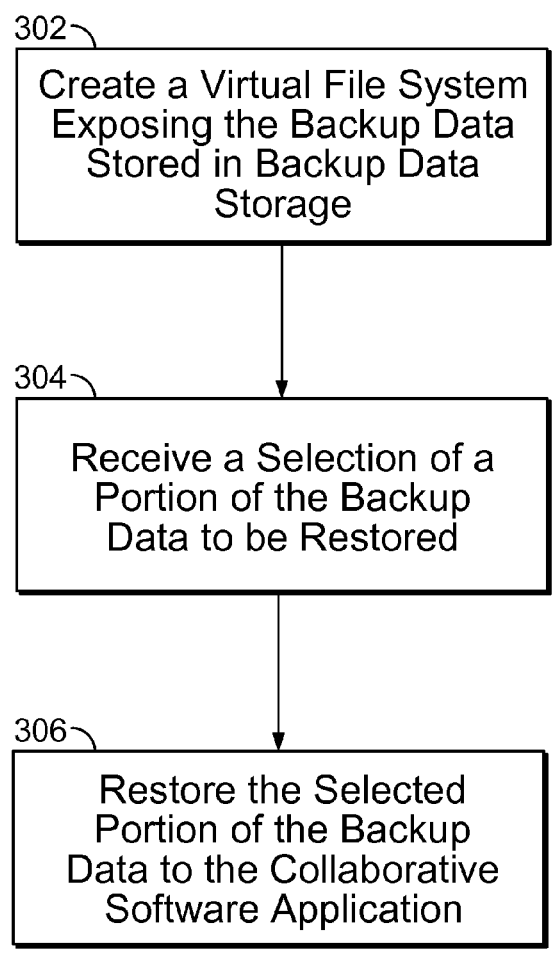
FIG. 3 is a flow chart illustrating an embodiment of a granular-level restore process 300.

FIG. 3 is a flow chart illustrating an embodiment of a granular-level restore process 300. In some embodiments, process 300 can be used to implement step 206 of process 200 as shown in FIG. 2.

At 302, a virtual file system (VFS) is created on a computer system on which backup and restore client 112 is run. The virtual file system exposes the backup data stored in backup data storage 104 as if the backup data are accessible on a local disk of the computer system. This is achieved by mounting the backup data stored in backup data storage 104 onto the virtual file system.

One example of the virtual file system is AxionFS in EMC Corporation's Avamar File System (AvFs). AxionFS is a virtual file system created on a computer system on which an Avamar client is run. The virtual file system exposes the backup data stored in the data storage of an Avamar backup and restore server as if the backup data are accessible on a local disk of the computer system. In some embodiments, AvFs utilizes EldoS Corporation's Callback File System (hereinafter referred to as EldoS CbFS) to create a virtual file system that exposes the backup data to a Microsoft Windows operating system.

Figure 4:
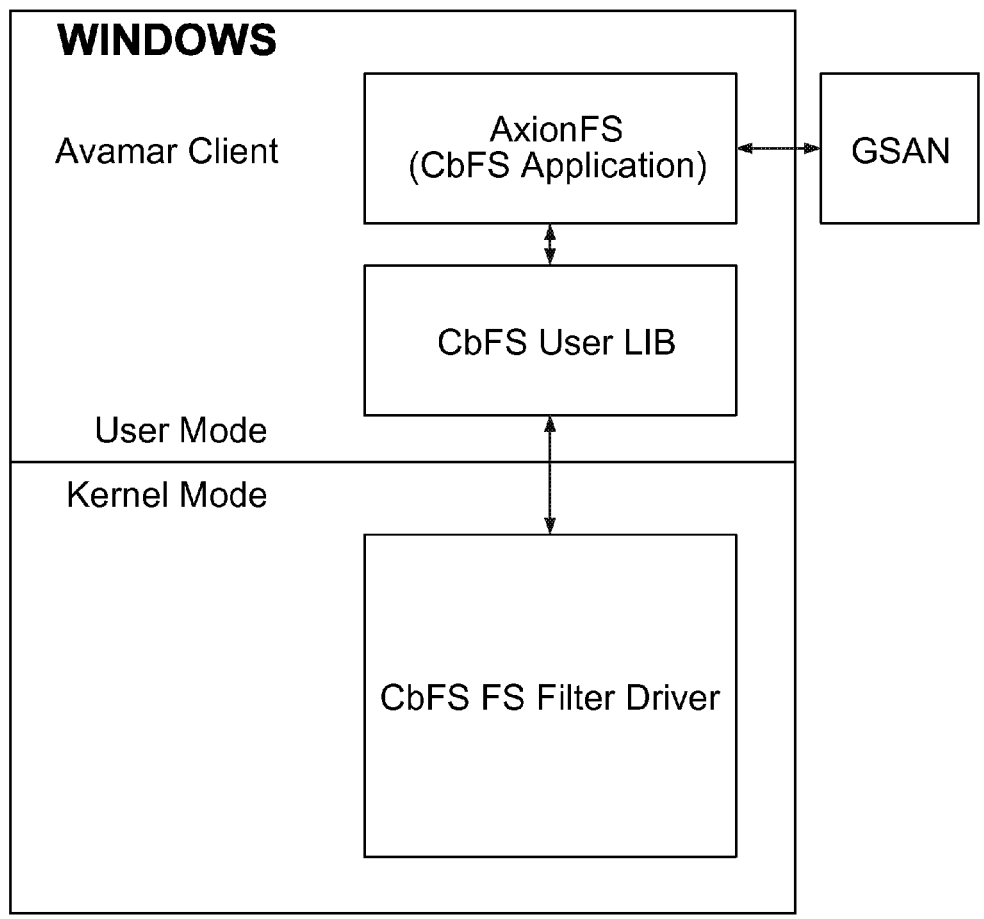
FIG. 4 is a block diagram illustrating an embodiment of an Avamar client with its virtual file system AxionFS.

FIG. 4 is a block diagram illustrating an embodiment of an Avamar client with its virtual file system AxionFS. As illustrated in FIG. 4, EldoS CbFS provides a kernel-mode filter driver to expose the disks, volumes, and file system objects of the data storage of an Avamar backup and restore server. EldoS CbFS also provides a user-mode CbFS library. This CbFS library allows developers to specify callback functions that are invoked by the EldoS kernel-mode driver when file system calls are being serviced. For example, EldoS CbFS provides directory enumeration callback functions, and AvFS would implement these functions to "fill-in" the directory contents with the directory elements from the Avamar backup.

Because AxionFS exposes the backup data stored in the data storage of an Avamar backup and restore server as if the backup data are accessible on a local disk of the computer system, a graphical user interface (GUI) may be used to display information of the backup data mounted on AxionFS for browsing. For example, the graphical user interface may be used to allow a user (e.g., a Microsoft Exchange Server administrator) to create a recovery storage group (RSG for Microsoft Exchange Server 2007) or a recovery database (RDB for Microsoft Exchange Server 2010) on the virtual file system. After an RSG or RDB is created on the virtual file system, the Microsoft Exchange Server administrator may further use the graphical user interface to select an Exchange database to be mounted in the RSG or RDB on the virtual file system, exposing the selected Exchange database to the virtual file system. After the Exchange database is mounted, a list of individual Microsoft Exchange Server items that may be selectively restored by the user can then be displayed. For example, the graphical user interface may display a list of Microsoft Exchange Server items that can be restored individually, such as e-mail messages, mailboxes, fax messages, contact lists, tasks, and calendar entries. In some embodiments, the graphical user interface may further allow a user to granularly search for and restore individual Microsoft Exchange items. In some embodiments, the graphical user interface includes Messaging Application Programming Interface (MAPI) calls for extracting information of the Microsoft Exchange Server items for browsing purposes.

With continued reference to FIG. 3, a selection of a portion of the backup data to be restored to collaborative software servers 108 and data storage 110 is received at 304. For example, a Microsoft Exchange Server administrator may select one or more Microsoft Exchange Server items from the displayed list described above to be restored to collaborative software servers 108 and data storage 110. For example, the selected items may be restored to a production mailbox.

At 306, the selected portion of the backup data is restored back to collaborative software servers 108 and data storage 110. For example, after Avamar client 206 has received the selection of Microsoft Exchange items from a Microsoft Exchange Server administrator, Avamar client 206 may request Avamar backup and restore server 202 to restore those items back to Microsoft Exchange Servers 108 and data storage 110.

As illustrated above, granular-level restore using a virtual file system saves both time and resources compared to image-based full-restore. The virtual file system exposes the backup data stored in backup data storage 104 without actually retrieving the backup data. Backup data are read and transferred through the network on demand based on the specific needs of the end-users.

In some embodiments, the backup data mounted on AxionFS are deduplicated. In some embodiments, the backup data mounted on AxionFS are readable and writeable by a user of a computer system running the Avamar client.

In some embodiments, in order to preserve the backup data stored in backup data storage 104, the backup data are write-protected. Therefore, writes to AxionFS are temporarily cached in memory or stored on a local disk, and retained for the lifecycle of the virtual file system. As a result, when AxionFS is shutdown, any writes to AxionFS are lost. Microsoft Exchange replays transaction log files as part of a restoration and database mount process. When transaction logs are replayed, Exchange will perform writes to the database files that are mounted on AxionFS. These writes are temporarily cached in memory or stored on a local disk, and retained for the lifecycle of AxionFS only.

Figure 5:
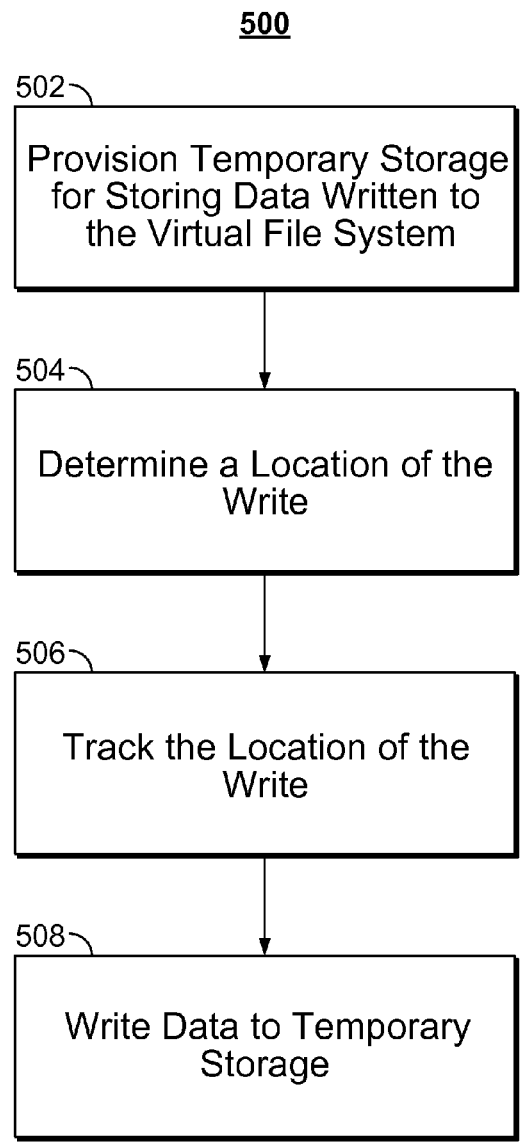
FIG. 5 is a flow chart illustrating an embodiment of a write process 500 in AxionFS.

FIG. 5 is a flow chart illustrating an embodiment of a write process 500 in AxionFS. At 502, a temporary storage is provisioned for storing the data written to the virtual file system. For example, the temporary storage may be a local disk or a local cache. At 504, a location to which data are written is determined; for example, data may be written to a database file and the block location (e.g., block #5) of the database file to which data are written is determined at 504. At 506, the location of the write operation is tracked. For example, the block location of the file to which data are written may be tracked in a bitmap. In some embodiments, the bitmap is stored in a local memory or cache. At 508, the data written to the virtual file system is written to the provisioned temporary storage.

Figure 6:
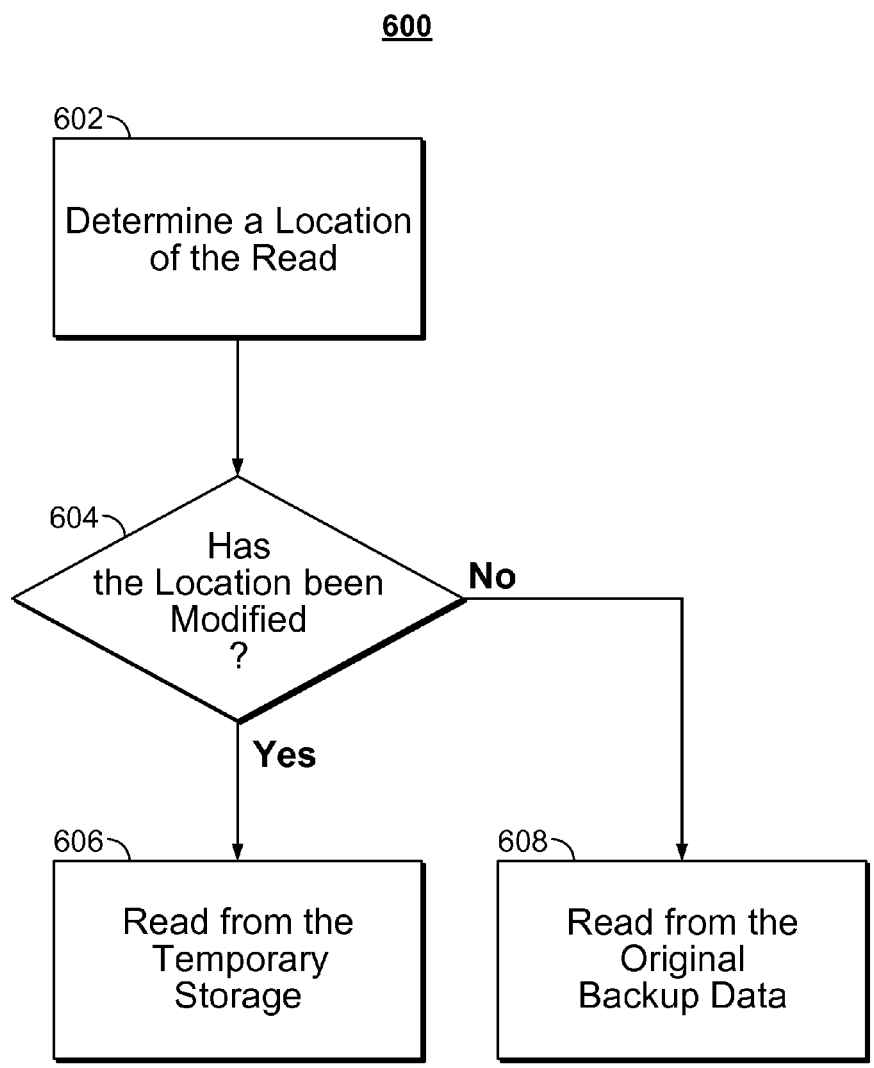
FIG. 6 is a flow chart illustrating an embodiment of a read process 600 in AxionFS.

FIG. 6 is a flow chart illustrating an embodiment of a read process 600 in AxionFS. At 602, a location from which data is read is determined. For example, the block location of a file where Microsoft Exchange reads from is determined at 602. At 604, if the determined location has previously been modified according to the bitmap, then data is read from the provisioned temporary storage at 606. Otherwise, data is read from the original backup data mounted on the virtual file system at 608.

In some embodiments, the virtual file system further allows the application to rename or move files that are mounted on the virtual file system. Similar to the write operation described above, these file operations and changes are retained for the lifecycle of the virtual file system.

Some Microsoft Exchange operations require transaction log files to be placed in a sub-folder such that checksums can be performed on the transaction log files. For example, when an image-based full restore is performed, the number of transaction log files on which a checksum needs to be performed can be as large as hundreds of thousands, and the time and resources for performing these checksums can potentially be very high. Therefore, in a granular-level restore, only a subset of the transaction log files that are required for restoring the few selected Microsoft Exchange items are placed in the special folder, thus reducing the time and resources for performing the checksums significantly. The subset of the transaction log files can be determined using the ESeutil utility provided by Microsoft Exchange.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for restoring data associated with a collaborative software application, comprising:
creating a virtual file system exposing backup data of a collaborative software application stored in a backup data storage;
receiving via an interface associated with the virtual file system a selection of a portion of the backup data to be restored to the collaborative software application;
causing the selected portion of the backup data to be transferred through a network on demand to be granularly restored to the collaborative software application without transferring and restoring one or more unselected portions of the backup data, wherein transferred through a network on demand comprises transferring after the receiving of the selection of the portion of the backup data to be restored to the collaborative software application; and
in response to a write operation by the collaborative software application, writing data associated with the write operation to the virtual file system and write-protecting the backup data stored in the backup data storage.

2. The method of claim 1, wherein the collaborative software application is a Microsoft Exchange application.

3. The method of claim 2, further comprising displaying via the interface associated with the virtual file system one or more individual Microsoft Exchange items that are restorable to the collaborative software application.

4. The method of claim 2, further comprising allowing a user to create a recovery storage group or a recovery database on the virtual file system via the interface associated with the virtual file system.

5. The method of claim 2, wherein the selected portion of the backup data to be restored to the collaborative software application comprises an individual Microsoft Exchange item.

6. The method of claim 5, wherein causing the individual Microsoft Exchange item to be granularly restored to the collaborative software application comprises causing the individual Microsoft Exchange item to be granularly restored to a database of the Microsoft Exchange application.

7. The method of claim 5, wherein the individual Microsoft Exchange item comprises one of the following: an e-mail message, a mailbox, a fax message, a contact list, a task, and a calendar entry.

8. The method of claim 1, wherein the virtual file system is created on a computer system on which a backup and restore client is run.

9. The method of claim 8, wherein the computer system includes a Microsoft Windows operating system, and wherein the backup data is exposed to the Microsoft Windows operating system.

10. The method of claim 1, wherein the backup data comprises deduplicated backup data.

11. The method of claim 1, wherein the backup data is backed up by a single-pass backup process.

12. The method of claim 1, wherein creating the virtual file system further comprises providing search functions of the exposed backup data.

13. The method of claim 1, wherein data associated with the write operation is stored in a temporary storage for a lifecycle of the virtual file system.

14. The method of claim 13, wherein the data associated with the write operation is read from the temporary storage in response to a subsequent read operation to read the data associated with the write operation.

15. The method of claim 1, wherein a location to which the data associated with the write operation is written to is tracked using a bitmap.

16. The method of claim 1, wherein causing the selected portion of the backup data to be granularly restored further comprises putting a subset of transaction log files corresponding to an image-based full restore into a sub-folder for checksum operations.

17. A system for restoring data associated with a collaborative software application, comprising:
a processor configured to:
create a virtual file system exposing backup data of a collaborative software application stored in a backup data storage without retrieving the backup data from the backup data storage; and
a backup and restore client configured to:
receive via an interface associated with the virtual file system a selection of a portion of the backup data to be restored to the collaborative software application; and
cause the selected portion of the backup data to be transferred through a network on demand to be granularly restored to the collaborative software application without restoring one or more unselected portions of the backup data, wherein transferred through a network on demand comprises transferring after the receiving of the selection of the portion of the backup data to be restored to the collaborative software application; and
a memory coupled to the processor and configured to provide the processor with instructions; and
wherein the virtual file system is further configured to, in response to a write operation by the collaborative software application, write data associated with the write operation to the virtual file system and write-protect the backup data stored in the backup data storage.

18. The system of claim 17, wherein the collaborative software application is a Microsoft Exchange application.

19. The system of claim 17, wherein the selected portion of the backup data to be restored to the collaborative software application comprises an individual Microsoft Exchange item.

20. The system of claim 17, wherein the virtual file system is further configured to provide search functions of the exposed backup data.

21. The system of claim 17, wherein data associated with the write operation is stored in a temporary storage for a lifecycle of the virtual file system.

22. The system of claim 21, wherein the data associated with the write operation is read from the temporary storage in response to a subsequent read operation to read data associated with the write operation.

23. The system of claim 17, wherein a location to which the associated with the write operation is written to is tracked using a bitmap.

24. The system of claim 17, wherein causing the selected portion of the backup data to be granularly restored further comprises putting a subset of transaction log files corresponding to an image-based full restore into a sub-folder for checksum operations.

25. A computer program product for restoring a collaborative software application, the computer program product being embodied in a non-transitory computer readable storage medium and comprising computer instructions for:
creating a virtual file system exposing backup data of a collaborative software application stored in a backup data storage;
receiving via an interface associated with the virtual file system a selection of a portion of the backup data to be restored to the collaborative software application;
causing the selected portion of the backup data to be transferred through a network on demand to be granularly restored to the collaborative software application without restoring one or more unselected portions of the backup data, wherein transferred through a network on demand comprises transferring after the receiving of the selection of the portion of the backup data to be restored to the collaborative software application; and
in response to a write operation by the collaborative software application, writing data associated with the write operation to the virtual file system and write-protecting the backup data stored in the backup data storage.

26. The computer program product of claim 25, wherein the collaborative software application is a Microsoft Exchange application.

27. The computer program product of claim 26, wherein the selected portion of the backup data to be restored to the collaborative software application comprises an individual Microsoft Exchange item.

* * * * *